Jan. 31, 1928.
V. G. VAUGHAN
1,657,521
CONTROL SYSTEM FOR ELECTRIC RANGES
Filed Nov. 5, 1923
2 Sheets-Sheet 1
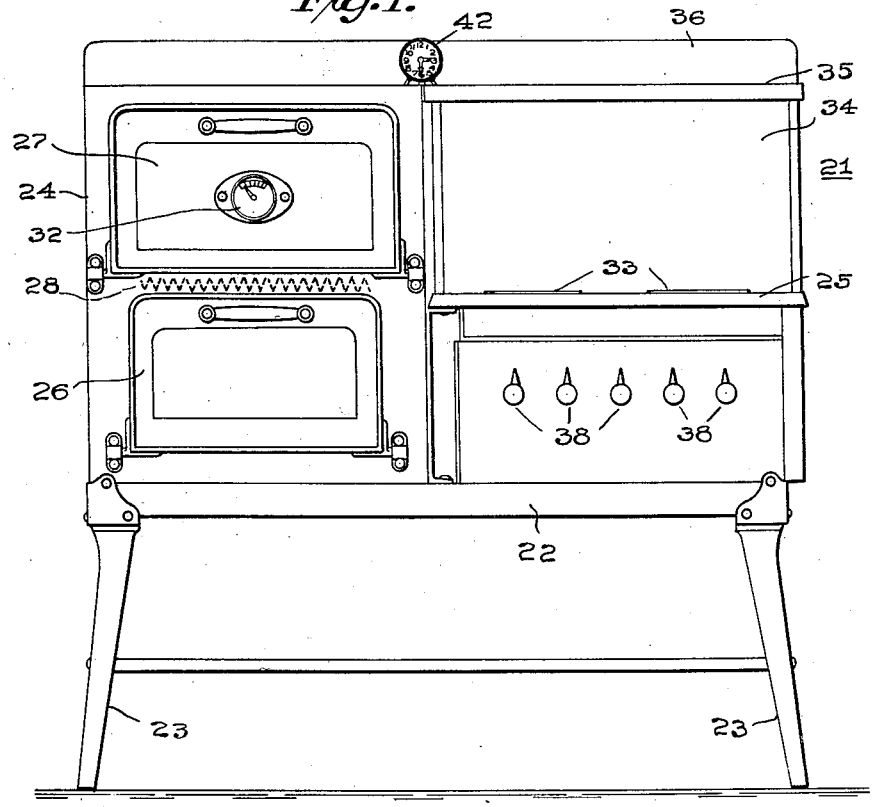
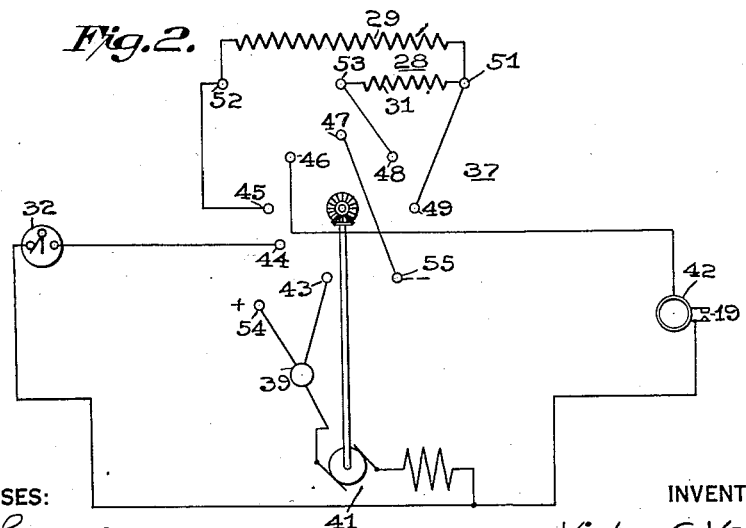
WITNESSES:
R. S. Harrison
H. M. Biebel
INVENTOR
Victor G. Vaughan
BY
Chesley S. Carr
ATTORNEY Jan. 31, 1928.
V. G. VAUGHAN
1,657,521
CONTROL SYSTEM FOR ELECTRIC RANGES
Filed Nov. 5, 1923    2 Sheets-Sheet 2
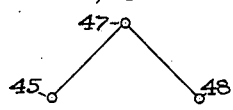
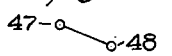
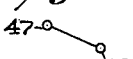
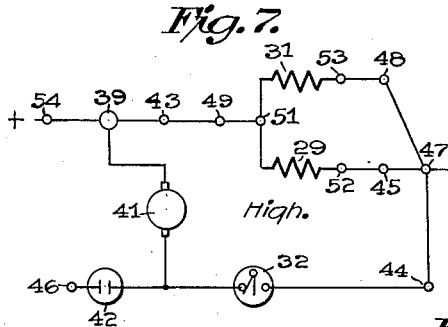
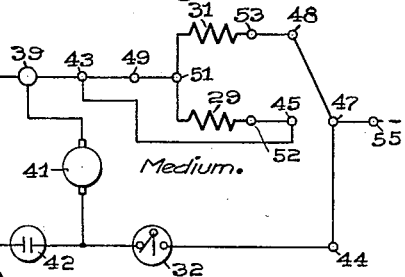
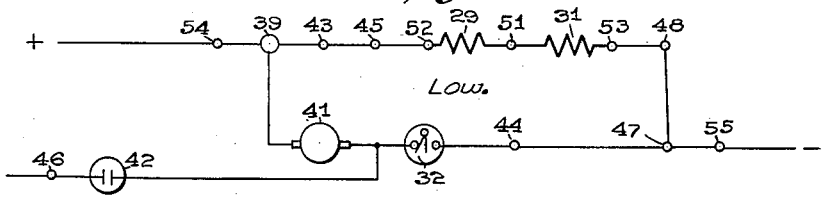
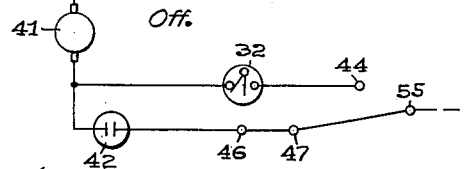
WITNESSES:
R. S. Harrison
H. M. Biebel
INVENTOR
Victor G. Vaughan
BY
Wesley G. Carr
ATTORNEY Patented Jan. 31, 1928.

1,657,521

UNITED STATES PATENT OFFICE.

VICTOR G. VAUGHAN, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM FOR ELECTRIC RANGES.

Application filed November 5, 1923. Serial No. 672,713.

My invention relates to electric heating appliances and particularly to temperature-control systems therefor.

One object of my invention is to provide a relatively simple and inexpensive control system for a plural-coil heating element of an electrically heated appliance that shall comprise relatively few parts and be easy to operate.

In a control system of the kind disclosed and claimed in Patent No. 1,180,571, issued to L. G. Copeman, on April 25, 1916, and assigned to the Westinghouse Electric Products Company, as applied to electric ranges, the following parts are necessary to properly employ the control system therein disclosed and claimed.

1. A switch adapted to be closed by a clock.
2. An electromagnetic circuit breaker that is controlled by the temperature of the range.
3. A snap switch to permit of obtaining either high, intermediate or low heats in connection with the plural-coil heating element employed.

In order to set or adjust the various parts employed in this system of control when it is desired to use it for cooking by the full-automatic method, the following steps are necessary:

1. To set the clock-controlled switch to its open position.
2. To set the clock to close the switch at a predetermined future hour.
3. To set the circuit breaker to the on or closed position.
4. To set the thermostat for a predetermined maximum temperature.
5. To set the snap switch.

In a control system embodying my present invention, it is necessary only to adjust the clock and the thermostat when it is desired to control the cooking operations, and my system, therefore, has as its further object, to reduce the number of operations in setting the various parts thereof, whereby the use of such an electric range is made easier.

This application is closely related to my copending application, Serial No. 672,712, filed November 5, 1923, and covers, more particularly, the use of the switch disclosed and claimed in that application as a part of a system of control as applied to electrically heated devices.

In practicing my invention, I provide a switch of the type disclosed and claimed in the above mentioned copending application that is operatively associated with a plural-coil heating element for either the oven or the stove of an electric range. A thermostat, of any suitable or desired type, is adapted to be actuated by the temperature of the oven, and a suitable time-controlled means is provided, both of which are adapted to co-operate with, and to actuate, the motor that is operatively associated with the snap switch.

In the drawings,

Figure 1 is a view, in front elevation, of an electric range with which the system embodying my invention is associated.

Fig. 2 is a schematic diagram of connections embodying my invention.

Fig. 3 is a schematic diagram of the connections effected by the snap switch when in the "high heat" position.

Figs. 4, 5 and 6 are schematic diagrams of connections effected by the snap switch when in "medium", "low", and "off" positions, respectively, and Figs. 7, 8, 9 and 10 are schematic diagrams of connections of the various parts of the system when in the "high", "medium", "low" and "off" positions, respectively.

An electric range 21 is here illustrated as comprising a platform 22, a plurality of supporting members 23 suitably secured thereto, an oven portion 24 and a stove portion 25.

The oven portion of the range is provided with a lower door 26 and an upper door 27 in order to permit of easy access to either the bottom or to the top portion of the oven chamber. A heating element 28 is located within the oven structure 24 and may be of any suitable or desired construction and has a plurality of coils 29 and 31, as illustrated more particularly in Fig. 2 of the drawings.

A thermostat 32 is located on the upper door 27 and is adapted to close a circuit upon the occurrence of a predetermined temperature within the oven chamber located within the oven structure 24.

The stove portion 25 comprises a plurality of heating elements 33, of any suitable or desired type, that may also be of the plural-coil construction. A stove back 34 is provided, together with a shelf 35, and a finish strip 36 at the top of the assembled range. A plurality of snap switches 37, one of which controls the oven heater and is of the type disclosed and claimed in my co-pending application, Serial No. 672,712, filed concurrently herewith, are located beneath the stove top and are provided with operating knobs or handles 38, the switches themselves being located within a suitable casing while the knobs are located outside of the front panel of the stove structure.

Fig. 2 of the drawing illustrates schematically the connections between the various parts of the switch 37, a fuse 39, and a motor 41 operatively connected to the switch 37, by any suitable mechanism, the thermostat 32, and a clock mechanism 42.

Terminal members 43, 44, 45, 46, 47, 48 and 49 are mounted on the snap switch structure 37, and connections are made therebetween by suitable contact-bridging members in the various consecutive operative and inoperative positions, as is illustrated by the connecting lines in Figs. 3 to 6, inclusive.

Corresponding ends of the resistor members 29 and 31 are connected together electrically and to a suitable terminal post 51 that is electrically connected to a terminal member 49 of the switch. The other end of the resistor member 29 is connected to a terminal post 52 that is electrically connected to the terminal member 45 of the switch. The other end of the resistor member 31 is connected to a terminal post 53 that is connected to terminal member 48 of the switch.

One end of the supply circuit (not shown) is electrically connected to a terminal post 54 that is connected to one terminal of the fuse member 39, and the other terminal of the supply circuit is connected to a terminal post 55 that is connected to terminal member 47 of the switch.

One terminal of the thermostat 32 is connected to terminal member 44, while the other end thereof is connected to one terminal of the motor 41, the same terminal being electrically connected to one of the contact posts of the clock mechanism 42. The other terminal of the clock mechanism is electrically connected to the terminal member 46 of the switch.

Fig. 10 of the drawing illustrates the connections that are established in the "off" position of the snap switch, with the clock mechanism 42 inoperative and the thermostat 32 also inoperative.

If the clock mechanism is operative to cause the two contact terminals thereof to momentarily engage, a circuit is established from positive terminal 54, through the fuse 39, motor 41, clock mechanism 42 and contact terminals 46 and 47 of the switch, to the other terminal 55 of the supply circuit. This causes the motor to operate and to move the snap switch from its off position to the first of its consecutive operative positions, in which position, the two portions 29 and 31 of the heating element are connected in parallel-circuit relation relatively to each other. This gives a "high heat" connection of the two parts of the heating element and is illustrated more particularly in Fig. 7 of the drawings, in what may be called a "straight line" diagram.

If the temperature of the appliance reaches a predetermined value for which the thermostat has been adjusted to operate, the following circuit is established: from the terminal 54 of the supply circuit, through the fuse 39, motor 41, thermostat 32, terminal 44 and terminal 47, to the other terminal 55 of the supply-circuit conductor. The motor, thus energized, actuates the switch to the second of its consecutive positions, effecting substantially the connections illustrated in Fig. 8 of the drawings.

However, as the energizing circuit through the motor to the thermostat is still established, by reason of the connection between the terminal members 44 and 47 being again established, the motor again operates and the switch is moved to the third of its consecutive operative positions, thereby connecting the two portions of the heating element in series-circuit relation, substantially as illustrated in Fig. 9 of the drawings. The energizing circuit through the motor and the thermostat is still established, thereby causing the motor once more to actuate the switch and this time to its "off" position.

It is possible to manually operate the switch without reference to either the thermostat or to the clock mechanism and if, for instance, the clock has established an energizing circuit through the motor, whereby the switch is caused to move from its off position to the first of its operative positions, and if the switch is now manually moved to either of the other consecutive positions, the thermostat can still establish a motor-energizing circuit, as hereinbefore described, upon the occurrence of a predetermined temperature, whereby the switch will be moved from whichever of its consecutive operative positions it may be in, to its inoperative position.

However, the normal conditions of operation will be those in which the snap switch is in its normal inoperative position and is moved to its "high heat" position by means of the clock mechanism, establishing an energizing circuit through the motor, after which the thermostat establishes a separate energizing circuit through the motor to cause the same to move through the "medium" and the "low heat" operative positions into its inoperative or off position.

The control system embodying my invention, thus makes it necessary only to set the clock for a predetermined future time of operation and to set the thermostat for a predetermined maximum temperature of the device, after which the system will operate to cause energization of the heating element at the predetermined time, whereby the temperature of the oven or of the device is raised, the thermostat closing a separate energizing circuit through the motor, upon the occurrence of a predetermined temperature, to cause the snap switch to be actuated through all of the remaining consecutive operative positions to its inoperative position. The system embodying my invention thus makes it possible to effect, with only two manual operations, what heretofore required five or more distinct operations, thus making it much easier for any one to use the electric oven of a range when employing my system.

Various modifications and changes may be made without departing from the spirit and scope of the invention. I desire, therefore, that only such limitations shall be placed thereon as are imposed by the prior art or are set forth in the appended claims.

I claim as my invention:

1. In a heating system for electrically heated appliances, in combination, a heating element, a snap switch for controlling the energization of said heating element and having a plurality of consecutive operative positions and an inoperative position, an electric motor for actuating said snap switch, a time controlled electric circuit for energizing said motor to actuate said switch to the first of its operative positions, and a separate temperature-controlled electric circuit for energizing said motor to actuate said switch through all of the remaining consecutive operative positions to its inoperative position.

2. In a heating system for electrically heated appliances, in combination, a plural coil heating element, a switch for connecting the coils of said heating element in different combinations and having a plurality of operative positions, means for actuating said switch, a time controlled electric circuit for energizing said actuating means to actuate said switch to an operative position, and a separate temperature controlled electric circuit for energizing said actuating means to actuate said switch through a plurality of consecutive operative positions to an inoperative position.

3. In a heating system for electrically heated appliances, in combination, a heating element, a snap switch for controlling the energization of said heating element and having a plurality of consecutive operative positions and an inoperative position, an electric motor for actuating said snap switch, a time controlled electric circuit for energizing said motor to actuate said switch to the first of its operative positions, and a separate temperature controlled electric circuit for energizing said motor to actuate said switch from any one of its operative positions through the remaining operative positions to its inoperative position.

4. In a heating system for electrically heated appliances, in combination, a heating element, a switch for controlling the energization of said heating element and having a plurality of consecutive operative positions and an inoperative position, electric means for actuating said switch, a time controlled electric circuit for energizing said actuating means to actuate said switch from its inoperative to the first of its operative positions only, said switch being manually adjustable to any of its other consecutive positions, and a separate temperature-controlled electric circuit for energizing said actuating means to actuate said switch from any one of the remaining operative positions to its inoperative position.

5. In a heating system for an electrically heated appliance, in combination, a plural coil heating element, a snap switch for connecting the coils of said heating element to obtain "high", "medium" and "low" heats in said appliance in accordance with a plurality of consecutive operative positions, an electric motor operatively connected to said snap switch for actuating the same, time controlled means for energizing said motor to actuate said switch to the first of its operative positions to obtain "high" heat, and separate temperature controlled means for repeatedly energizing said motor to actuate said switch through its remaining consecutive operative positions to its inoperative position.

6. In a heating system for electrically heated appliances, in combination, a heating element, a snap switch for controlling the energization of said heating element and having a plurality of consecutive operative positions and an inoperative position, an electric motor for actuating said snap switch, a time controlled electric circuit for energizing said motor to actuate said switch to the first of its operative positions, and temperature-controlled means co-operating with said snap switch for repeatedly energizing said motor to actuate said switch through its remaining consecutive operative positions to its inoperative position.

7. In a heating system for electrically heated appliances, in combination, a heating element, a snap switch for controlling the energization of said heating element and having a plurality of consecutive operative positions and an inoperative position, an electric motor for actuating said snap switch, a time-controlled electric means co-operating with said switch to establish a circuit through said motor in the inoperative position only of said switch, and separate temperature-controlled electric means co-operating with said switch in any one of its operative positions to establish a circuit through said motor upon the occurrence of a predetermined temperature in said appliance.

In testimony whereof, I have hereunto subscribed my name this 24th day of October 1923.

VICTOR G. VAUGHAN.